United States Patent
Shkolnikov

(10) Patent No.: US 8,384,671 B2
(45) Date of Patent: Feb. 26, 2013

(54) SPLIT QWERTY KEYBOARD WITH REDUCED NUMBER OF KEYS

(76) Inventor: Mark Shkolnikov, Herndon, VA (US)

(\*) Notice: Subject to any disclaimer, the term of this patent is extended or adjusted under 35 U.S.C. 154(b) by 935 days.

(21) Appl. No.: 12/348,698

(22) Filed: Jan. 5, 2009

(65) Prior Publication Data

US 2009/0174669 A1 Jul. 9, 2009

Related U.S. Application Data

(60) Provisional application No. 61/019,316, filed on Jan. 7, 2008.

(51) Int. Cl.
*G06F 3/02* (2006.01)
(52) U.S. Cl. ...................................................... 345/169
(58) Field of Classification Search .................. None
See application file for complete search history.

(56) References Cited

U.S. PATENT DOCUMENTS

| | | | |
|---|---|---|---|
| 5,644,338 A | 7/1997 | Bowen | |
| 5,818,437 A | 10/1998 | Grover et al. | |
| 6,005,496 A * | 12/1999 | Hargreaves et al. | 341/22 |
| D443,839 S | 6/2001 | Brandenberg et al. | |
| 6,307,549 B1 | 10/2001 | King et al. | |
| 6,628,508 B2 | 9/2003 | Lieu et al. | |
| 6,628,511 B2 | 9/2003 | Engstrom | |
| D481,368 S | 10/2003 | Helin | |
| D481,710 S | 11/2003 | Helin | |
| D481,733 S | 11/2003 | Pan et al. | |
| D488,465 S | 4/2004 | Gartrell et al. | |
| 6,801,796 B2 | 10/2004 | Finke-Anlauff | |
| D501,001 S | 1/2005 | Pottie et al. | |
| D504,888 S | 5/2005 | Majanen | |
| 7,048,456 B2 | 5/2006 | Keinonen et al. | |
| 7,081,837 B2 | 7/2006 | Bollman | |
| 7,202,853 B2 | 4/2007 | Ng et al. | |
| 7,283,065 B2 | 10/2007 | Scott et al. | |
| 7,312,410 B2 * | 12/2007 | Griffin et al. | 200/5 A |
| 2003/0002007 A1 | 1/2003 | Meringer | |
| 2003/0063070 A1 * | 4/2003 | Kang | 345/168 |
| 2003/0117374 A1 * | 6/2003 | McCloud | 345/168 |
| 2003/0179178 A1 * | 9/2003 | Zargham | 345/156 |
| 2003/0193478 A1 * | 10/2003 | Ng et al. | 345/168 |
| 2004/0027335 A1 | 2/2004 | Lin | |
| 2004/0041792 A1 * | 3/2004 | Criscione | 345/169 |
| 2005/0024338 A1 * | 2/2005 | Ye | 345/168 |
| 2005/0235021 A1 | 10/2005 | Chen et al. | |
| 2006/0002072 A1 | 1/2006 | Sutton et al. | |
| 2006/0012574 A1 * | 1/2006 | Kauk et al. | 345/169 |
| 2006/0022947 A1 * | 2/2006 | Griffin et al. | 345/168 |
| 2006/0158428 A1 | 7/2006 | Lazaridis et al. | |
| 2006/0244727 A1 * | 11/2006 | Salman et al. | 345/168 |
| 2006/0244729 A1 | 11/2006 | Vander Veen | |
| 2007/0109270 A1 * | 5/2007 | Kim et al. | 345/169 |
| 2007/0126703 A1 * | 6/2007 | Griffin et al. | 345/169 |

(Continued)

FOREIGN PATENT DOCUMENTS

SG 126077 10/2006
WO WO 2005/119416 A1 12/2005

*Primary Examiner* — Peter Vincent Agustin
(74) *Attorney, Agent, or Firm* — Lieberman & Brandsdorfer, LLC

(57) ABSTRACT

A reduced size and split keyboard arrangement is provided for a portable computing apparatus. The arrangement of the keys, together with mapping of multiple characters to the keys allows reduction of the keyboard to a smaller footprint of a handheld device. Keys may have a single character or multiple characters mapped thereto. For the keys with multiple character mapping, the selection of the character may be by done by simultaneous or near-simultaneous pressing of adjacent physical keys. In one embodiment, disambiguation software may be employed to determine selection of a character from a physical or virtual key with multiple characters assigned thereto.

14 Claims, 15 Drawing Sheets

U.S. PATENT DOCUMENTS

2007/0159466 A1 7/2007 Kawell et al.
2007/0239425 A1 10/2007 Fux
2007/0279387 A1* 12/2007 Pletikosa et al. .............. 345/169
2009/0174669 A1* 7/2009 Shkolnikov ................... 345/169
2009/0186663 A1* 7/2009 Griffin et al. ................. 455/566

* cited by examiner

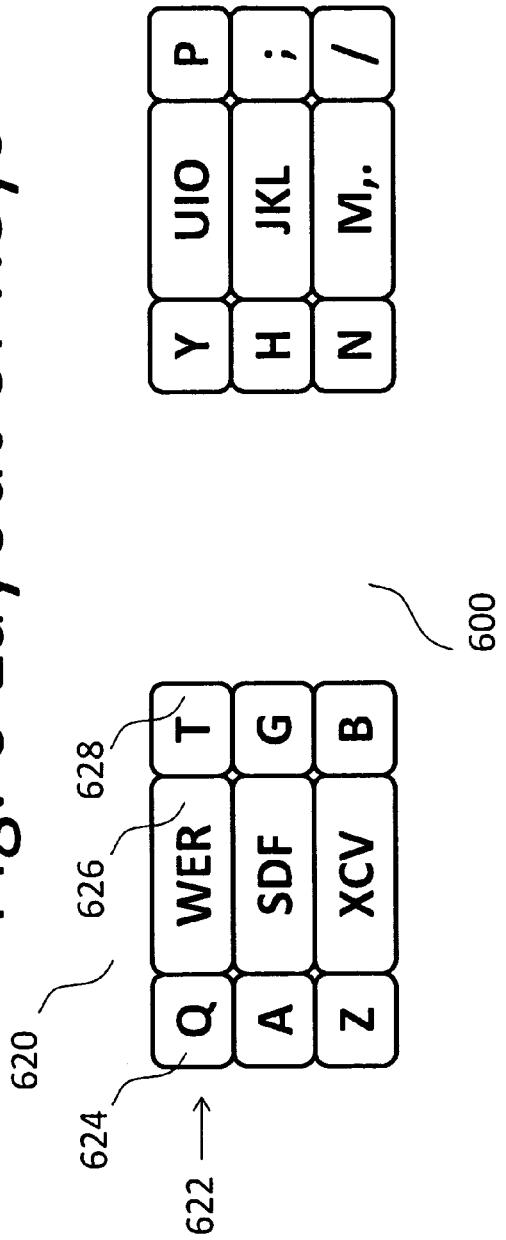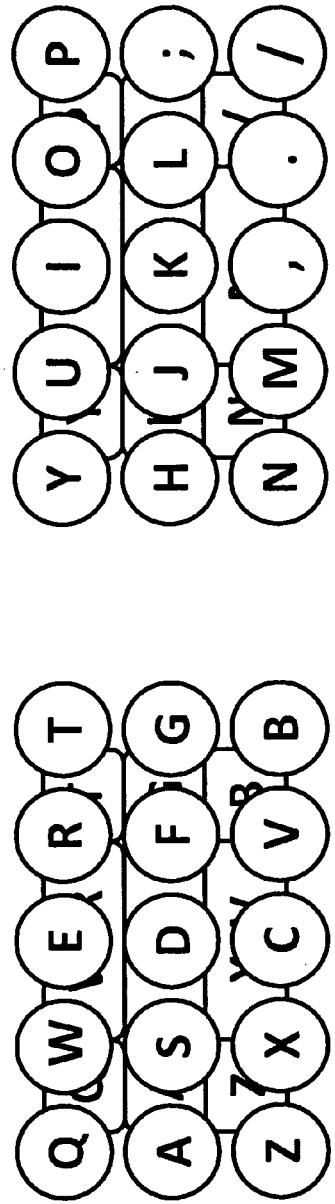
Fig. 6 Layout of Keys
Finger Presses

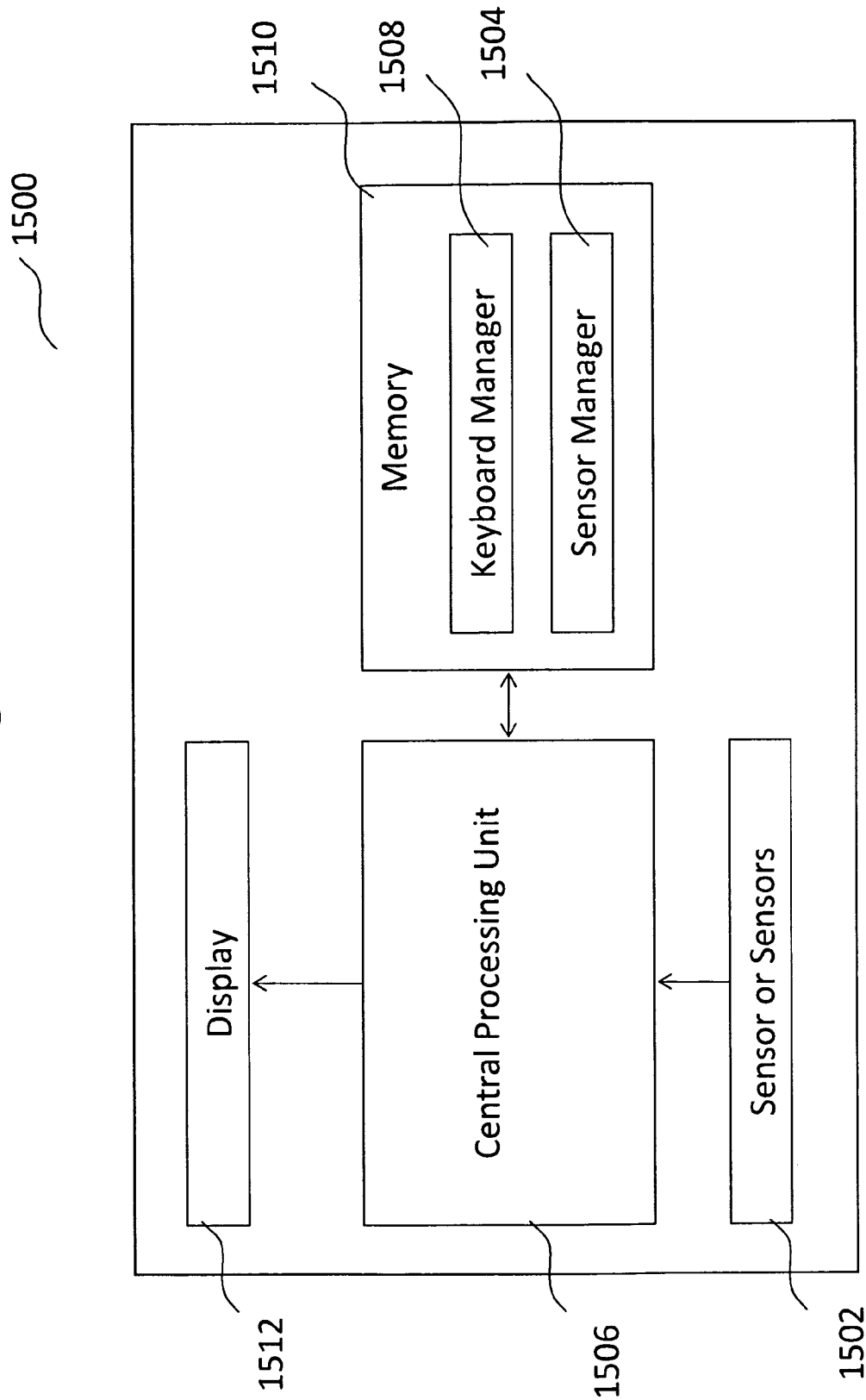

SPLIT QWERTY KEYBOARD WITH REDUCED NUMBER OF KEYS

CROSS REFERENCE TO RELATED APPLICATION(S)

This application is a non-provisional patent application claiming the benefit of the filing date of U.S. Provisional application Ser. No. 61/019,316 filed on Jan. 7, 2008, and titled "Split QWERTY Keyboard With Reduced Number of Keys", which is hereby incorporation by reference.

BACKGROUND

1. Technical Field

The invention relates to a reduced keyboard for a portable electronic apparatus. More specifically, it relates to reduced keyboards using memory mapping of prominent keyboard layouts such as QWERTY type and optional disambiguation software to resolve ambiguous keystrokes.

2. Background of the Invention

A computer is a programmable machine that responds to a specific set of instructions in a well-defined manner, and executes a pre-recorded list of instructions, also known as a program. Modern computers are electronic and digital apparatus that employs hardware and software components to support the list of instructions. Hardware components include, but are not limited to, processors, memory, storage, input devices, output devices, etc. Similarly, software components include, but are not limited to, programs. As noted above, programs are employed to manipulate data, send messages to an external device, etc.

Computers have evolved over time from a large stand-up computer requiring punch cards, to personal desktop computer, portable laptop computer, personal digital assistants, etc. Regardless of the form of the computer, each computer requires input in some form from an input device. Examples of an input device include a keyboard, a mouse, a trackball, a pointer, etc. With the exception of a keyboard, the listed input devices do not support direct entry of alphanumeric characters into an associated computing apparatus. For the most part, desktop computers and laptops employ a full size QWERTY keyboard for input of alphanumeric characters. Although some may argue that the full size QWERTY keyboard of a laptop computer is not full size and that data entry is difficult from a laptop keyboard, the keyboard of the laptop computer offers use of a full entry keyboard with separate keys for each alphanumeric character. The concern with entry of alphanumeric data into a computer becomes significant with respect to newly emerged and emerging computing devices, such as personal digital assistants (PDAs), mobile telephones, and other reduced size computing apparatus. It is known in the art that such emerging devices, including but not limited to mobile computing devices, may employ a full QWERTY keyboard with a reduced size. Such a configuration supports the full QWERTY keyboard layout, but with a reduced footprint, which employs smaller keys. The reduced size keyboard enables traditional input of alphanumeric data, with the challenge of a reduced size keyboard.

With the advancement of technology, computing apparatus have been decreasing in size, thereby making the computing apparatus more portable. However, the portability also removes the ability to enter alphanumeric data through a traditional QWERTY keyboard. One example where this is prevalent is with mobile handheld devices, such as mobile telephones and similar devices. Text messaging is a very popular application for mobile handheld devices. There are mobile handheld devices that employ a full QWERTY keyboard at a reduced size, but such keyboards are difficult to use since the keys are reduced. Other mobile handheld devices support entry of alphanumeric data through a traditional twelve button telephone keypad, also known as an ITU keypad, wherein each button on the keypad supports three or four characters. The employment of the telephone keypad for key entry is difficult as data entry is slow in comparison to a QWERTY keyboard due to necessity to multitap or resolve ambiguities which are beyond capabilities of disambiguating software. Also, the telephone keypad does not accommodate double handed typing of characters. With the advancement of text messaging through mobile telephones, there is a need for an input apparatus that facilitates entry of alphanumeric data.

Accordingly, there is a need for a keyboard for input of alphanumeric data into a reduced size computing or telephonic apparatus. The keyboard should be a reduced size from that of a QWERTY keyboard, in that there should be a reduced the number of keys. At the same time, the reduced size keyboard may utilize a mapping of a QWERTY or any other prominent keyboard layout. The employment of the mapping will enable users to intuitively understand the layout of keys for data entry, thereby making the data entry with a reduced number of keys efficient.

SUMMARY OF THE INVENTION

The invention discloses a split QWERTY keyboard with a reduced number of keys and a full alphabet layout.

In one aspect of the invention, a keyboard is provided for a computing device. More specifically, the computing device is provided with at least two individual keypads that are separated by either a visual display or space. Each of the individual keypads has a small quantity of physical keys. The total quantity of physical keys on both of the two keypads is less than the total quantity of alphanumeric characters mapped to the keys provided. In combination, the two keypads yield a full character alphabet layout for use on a device.

In another aspect of the invention, a computer system is provided with a processor in communication with memory and a visual display. A keyboard is also provided in communication with the processor. The keyboard has a fewer number of keys than a full size keyboard. A keyboard manager is provided in communication with the processor. The keyboard manager processes a pattern key actuation on the keyboard to determine input indicia to be shown on the visual display. In addition, both a sensor and a sensor manager are provided in communication with the processor. The sensor determines orientation of the keyboard and conveys the determined orientation to the sensor manager. The sensor manager maps indicia on the visual based upon the sensor determined orientation.

In yet another aspect of the invention, an article is provided to support a reduced size keyboard for a computing apparatus. The article includes a computer readable carrier including computer program instructions configured to convey indicia to a visual display. Instructions are provided to process key actuation on the keyboard, and to determine input indicia for the visual display based upon a pattern of key actuation. In addition, instructions are provided to determine orientation of the keyboard and to map indicia on the visual display based upon the determined orientation. The visual display presents indicia based upon the determined orientation and the pattern of key actuation.

BRIEF DESCRIPTION OF THE DRAWINGS

FIG. 6 is a block diagram demonstrating one embodiment of assignment of characters to each of the physical keys.

FIG. 15 is a block diagram illustrating placement of instructions for employment of the reduced keyboard to support functionality of a full-size keyboard.

DESCRIPTION OF THE PREFERRED EMBODIMENT

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but merely be representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiment of the invention will be best understood by reference to the drawings, wherein like parts are designated by like numerals throughout. The following description is intended only by way of example, and simply illustrates certain select embodiments of devices, systems, and processes that are consistent with the invention as claimed herein.

Overview

The QWERTY keyboard of the present invention addresses the challenges mentioned above with respect to both a miniature QWERTY keyboard and a telephone keypad. A mobile computing apparatus, such as a personal computer, personal digital assistant, mobile telephone, or any combination of the above, is provided. The apparatus includes a visual display and a keypad that is split into two portions, with each portion of the keypad located on each side of the visual display. The two portions of the keypad employ a reduced number of keys, such that the combination of both of the two portions of the keypad do not meet or exceed the quantity of keys in a conventional QWERTY keyboard. To accommodate all of the alphanumeric characters of a full size QWERTY keyboard, the keys on the inside columns accommodate more than one character. The ambiguity of the middle column keystrokes is resolved either by simultaneous pressing of an adjacent key, patterns of depression of an adjacent key, or through the use of disambiguation software. Accordingly, the reduced size keyboard accommodates all of the alphanumeric keys of a full size keyboard.

Technical Details

Figure 1:
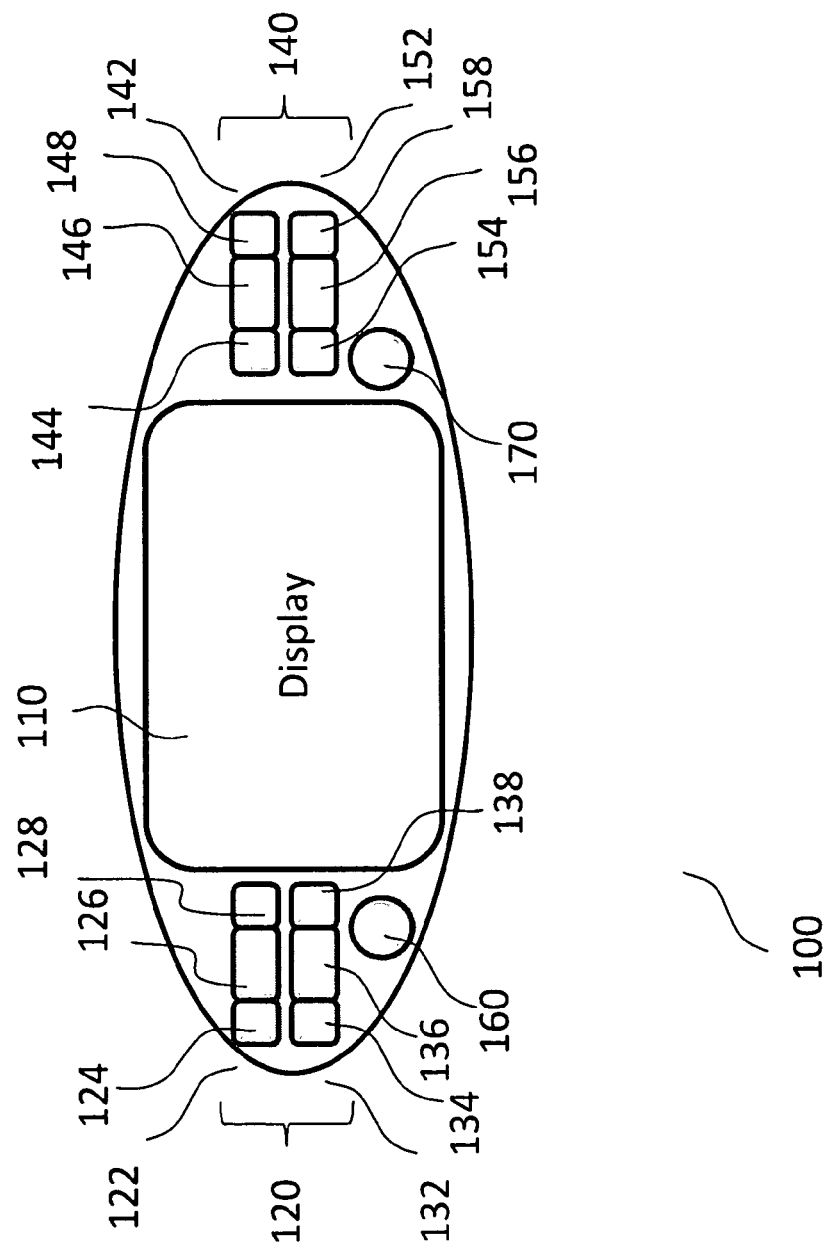
FIG. 1 shows a two-row split QWERTY keyboard with two parts of keys, one disposed to the left and the second disposed to the right of a visual display.

FIG. 1 is a block diagram (100) of a computing apparatus with a split QWERTY keyboard. As shown, there is a visual display (110) with a first set of keys (120) and a second set of keys (140), with each side (120) and (140) on each side of the display (110). In the embodiment shown herein, each set of keys (120) and (140) is limited to six keys each. However, the invention should not be limited to the quantity of keys shown herein. In one embodiment, there may be a fewer or greater quantity of keys for each set. As shown herein, the first set of keys (120) has two rows of keys (122) and (132), with each row having three keys therein. The first row (122) has keys (124), (126), and (128). The second row (132) has keys (134), (136), and (138). Similarly, the second set of keys (140) has two rows of keys (142) and (152). The first row (142) has keys (144), (146), and (148). The second row (152) has keys (154), (156), and (158). In addition to the rows of keys, there is a first additional key (160) that is employed for functionality separate from character selection. The first additional key (160) may be employed to carry out support functions. Examples of such support function include, but are not limited to shift, capital letters, control, delete, backspace, enter, and cursor position. Furthermore, in one embodiment, the apparatus may include a second additional key (170) that functions in conjunction with or supplementary to the first additional key (160). Although the first additional key (160) is shown adjacent to the first set of keys (120) and the second additional key (170) is shown adjacent to the second set of keys (140), the additional keys (160) and (170) are not necessarily assigned to the adjacent set of keys. Furthermore, additional keys (160) and (170) may individually be provided in different forms. For example, in one embodiment, additional keys (160) and (170) may be in the form of pointing devices such as joysticks, trackballs, rockers or touch pads. Accordingly, the first and second additional keys (160) and (170) in their various forms are provided to enable support functions.

Figure 2:
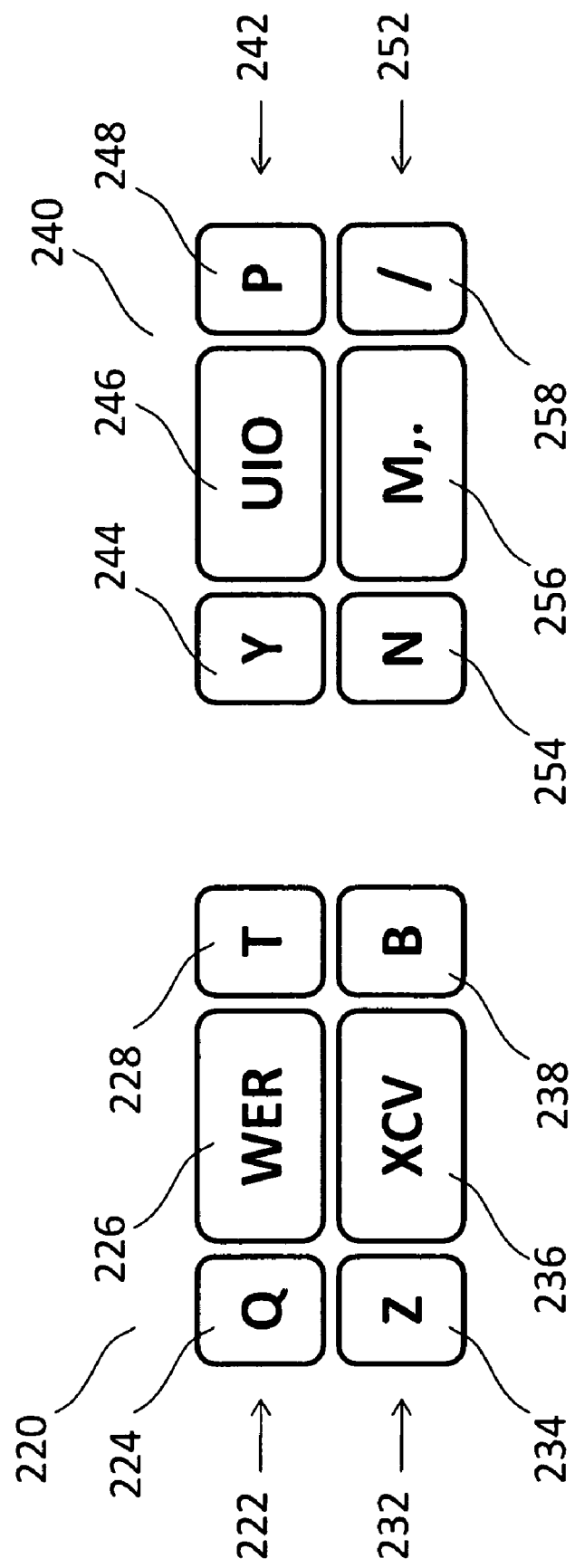
FIG. 2 is a diagram illustrating the layout of keys for the two-row configuration as shown in FIG. 1.

FIG. 2 is a block diagram (200) illustrating one example layout of keys for the two-row configuration as shown in FIG. 1. As shown, there are two keypads (220) and (240). The first keypad (220) has two rows of keys (222) and (232), with three columns in each row, for a total of six keys. Similarly, the second keypad (240) has two rows of keys (242) and (252), with three columns in each row, for a total of six keys. The first key in the first row (224) has a single alphanumeric character assigned thereto. Similarly, the third key (228) in the first row (222), and the first and third keys (234) and (238) in the second row (232) also have a single alphanumeric character assigned thereto. The middle keys (226) and (236) in the first and second rows (222) and (232), respectively, each have three alphanumeric characters assigned thereto. There is a similar arrangement on the second keypad. The first key in the first row (244) has a single alphanumeric character assigned thereto. Similarly, the third key (248) in the first row (242), and the first and third keys (254) and (258) in the second row (252) also have a single alphanumeric character assigned thereto. The middles keys (246) and (256) in the first and second rows (242) and (252), respectively, each have three alphanumeric characters assigned thereto. Accordingly, FIG. 2 is a sample layout of characters on the reduced and split keyboard.

Figure 3:
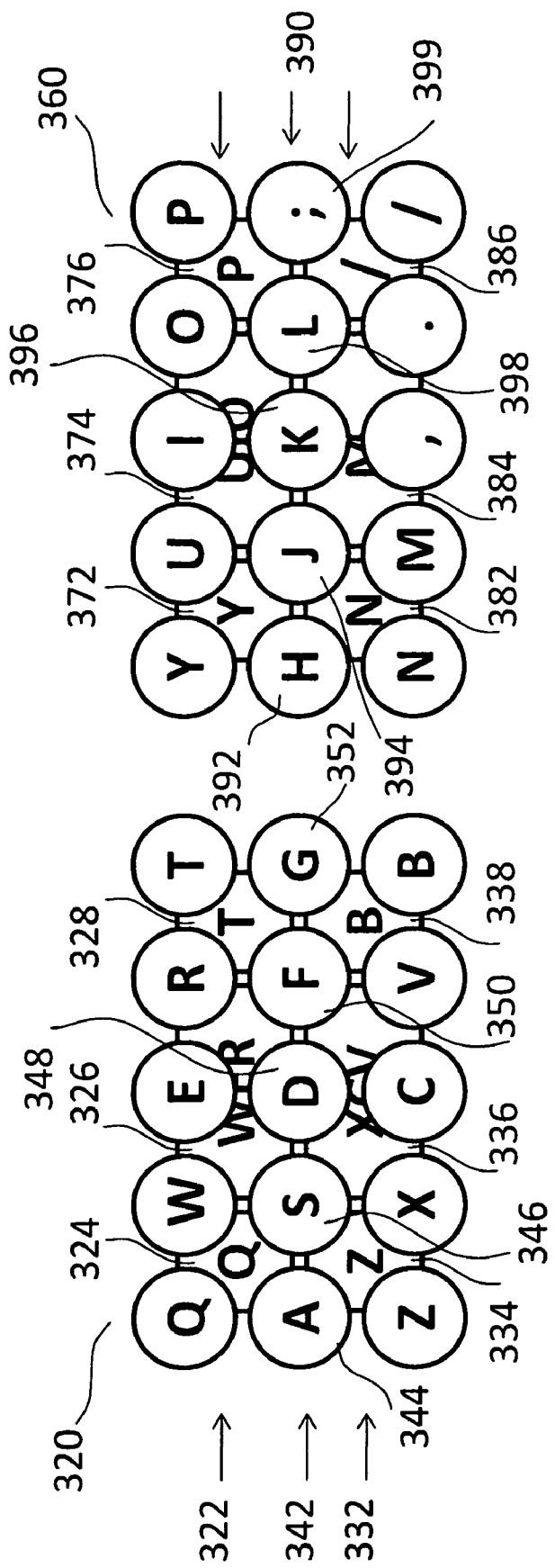
FIG. 3 is a diagram showing how the keys of the two row keyboard on FIG. 2 have to be activated in order to input a specific character.

FIG. 3 is a block diagram (300) of the reduced keyboard layout of FIG. 2. More specifically, this diagram demonstrates how the physical keys are activated to represent every character of the alphabet. One physical key or a combination of physical keys may be depressed or activated simultaneously. The combination of keys activated creates additional virtual keys. As shown in FIGS. 1 and 2, the first keypad (120), (220), respectively, has two rows of keys. Similarly, the second keypad (140), (240), respectively, has two rows of keys. However, the hardware of the two rows of keys is merely a hardware representation. In one embodiment, the hardware in combination with the keyboard software represents at least three rows of keys of the conventional QWERTY keyboard. As shown, the first keypad (320) has the two physical rows of keys (322) and (332), with the first physical row (322) having three physical keys (324), (326), and (328), and the second physical row (332) having three physical keys (334), (336), and (338). With the keyboard software which monitors the pattern(s) in which the physical keys are depressed, the two physical rows of keys represent three rows of keys, with one of the rows shown virtually. The virtual row (342) of the first keyboard (320) includes virtual keys (344), (346), (348), (350), and (352). In one embodiment, the assignment of the virtual keys of the first keypad are as follows: key (344) is assigned to the letter "A", key (346) is assigned to the letter "S", key (348) is assigned to the letter "D", key (350) is assigned to the letter "F", and key (352) is assigned to the letter "G". The second keypad (360) has two physical rows of keys (370) and (380), with the first physical row having three keys (372), (374), and (376), and the second physical row (380) having three physical keys (382), (384), and (386). With the disambiguation software or through the pattern in which the physical keys are depressed, the two physical rows (370) and (380) represent three rows of keys, with one of the rows shown virtually. The virtual row (390) includes virtual keys (392), (394), (396), (398), and (399). In one embodiment, the assignment of the virtual keys of the first keypad are as follows: key (392) is assigned to the letter "H", key (394) is assigned to the letter "J", key (396) is assigned to the letter "K", key (398) is assigned to the letter "L", and key (400) is assigned to the character ";". A description of how the physical and virtual characters are selected is described in detail below. Details of how the virtual keys are activated are described below in further detail.

A depression of a physical key that represents a single alphanumeric character will cause a selection of that character. However, a selection of a virtual character requires a user to depress physical keys in a specific pattern. More specifically, each physical key that represents more than one character is adjacent to a physical key that represents a single character. To select the left most character assigned to the middle physical key (326), the key (324) must be depressed together with key (326). Similarly, to select the right most character assigned to the middle physical key (326), the key (328) must be depressed together with the key (326). The same pattern may be applied to any of the physical rows of keys. However, as explained above, there is a virtual row of keys for each keypad.

In one embodiment, the physical and virtual layout of the keys and associated characters are shown on the physical apparatus. As shown in FIG. 3, the layout of the virtual keys and mapping of the corresponding (entered) characters can be displayed on the screen.

The following chart is an example of mapping of physical keys to enter characters in the keyboard. Although the mapping shown herein is for one of the keypads (320), the same or similar logic may be applied to the second keypad (360). Accordingly, the invention should not be limited to the keypad described in detail below:

| Entered Character | Physical Keys |
| --- | --- |
| Q | 324 |
| W | 324, 326 |
| E | 326 |
| R | 326, 328 |
| T | 328 |
| A | 324, 334 |
| S | 324, 334, 326, 336 |
| D | 326, 336, |
| F | 326, 336, 328, 338 |
| G | 328, 338 |
| Z | 334 |
| X | 334, 336 |
| C | 336 |
| V | 336, 338 |
| B | 338 |

Figure 4:
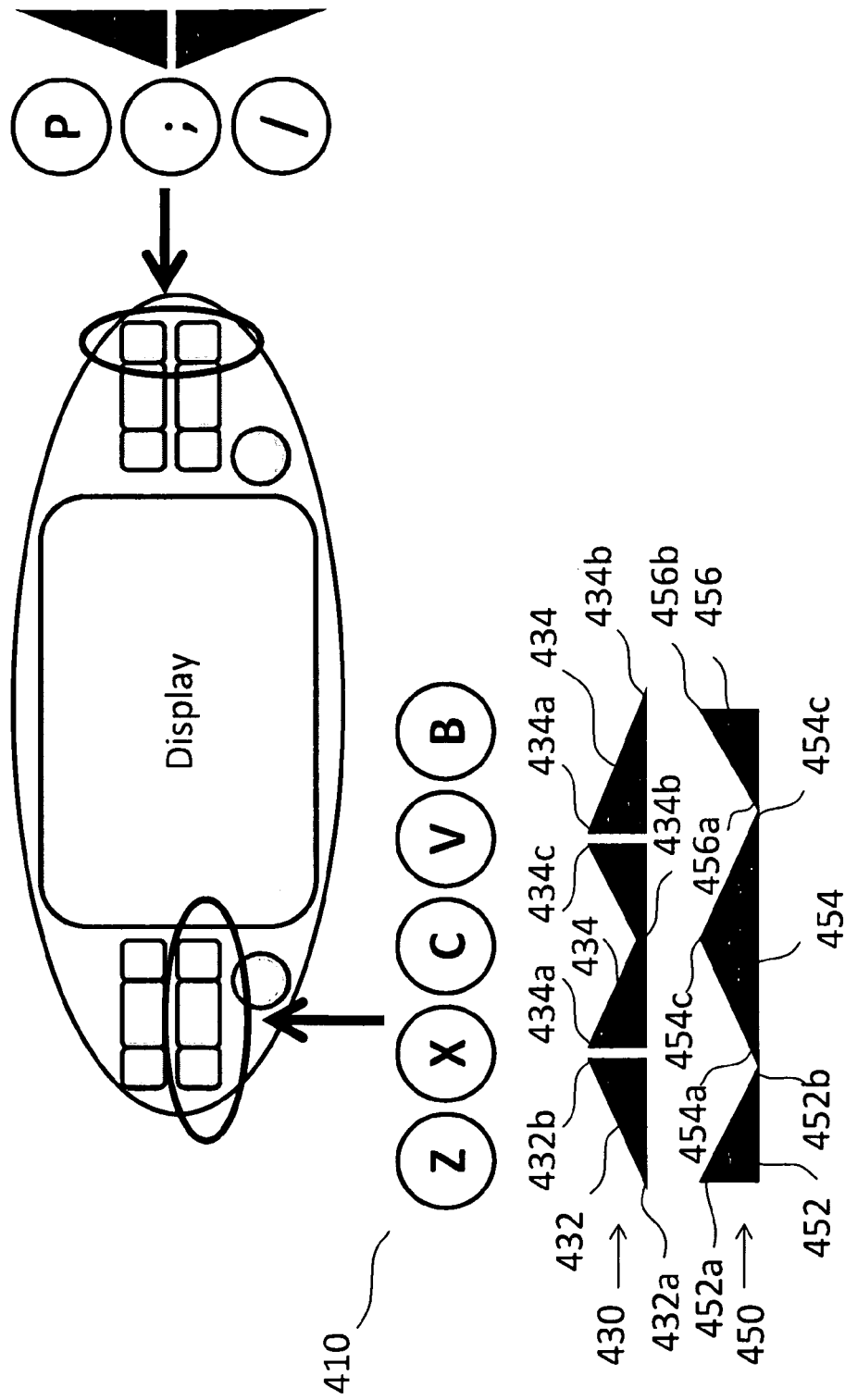
FIG. 4 is a block diagram illustrating the side view of the physical exterior topography of the physical keys.

In one embodiment, the physical keys are not flat planar surfaces. Rather, one of more of the keys may be an exterior surface with a concave or convex profile. FIG. 4 is a block diagram (400) illustrating the side view of the physical exterior topography of the physical keys. As shown, the keyboard has a reduced quantity of keys similar to the format shown in FIGS. 1 and 2. The topography is provided to assist with simultaneous or near-simultaneous depression of adjacent physical keys. More specifically, the first keyboard is shown in detail. As shown in FIGS. 1 and 2, the first keyboard (420) has two physical rows of keys (430) and (450). The first row of keys (430) has three keys (432), (434), and (436). Each of the keys (432), (434), and (436) have non-planar surfaces. The first physical key (432) is shown having a non-planar surface that has a positive slope extending from a bottom surface (432a) of the first key (432) to a top surface (432b) of the first key. The top surface (432b) is adjacent to a first top surface (434a) of the second key (434). As explained in association with FIGS. 1 and 2, the second key (434) represents at least three alphanumeric characters. In one embodiment, the second key (434) has a greater width than that of either the first key (432) or the third key (436). Similarly, the topography of the second key (434) may also be different from both the first and third keys (432) and (436), respectively. The second key (434) has a low topography point (434b) at a middle section of the key, with either exterior edges (434a) and (434c) having a raised high point. The third key (436) is shown having an inverted profile of the first key (432). Namely, the first edge has a raised portion (436a) that is adjacent to the raised portion (434c) of the second key (434), and the second edge has a low topography point (434b).

The physical topography of the physical keys should not be limited to the actual topography shown herein. In one embodiment, the physical topographies may have an inverse profile for one or more of the keys, or a different profile altogether. The second row (450) is shown having three keys (452), (454), and (456). Each of the keys (452), (454), and (456) have non-planar surfaces. The first physical key (452) is shown having a non-planar surface that has a negative slope extending from a top surface (452a) of the first key (452) to a bottom surface (452b) of the first key (452). The bottom surface (452b) is adjacent to a first bottom surface (454a) of the second key (454). As explained in association with FIGS. 1 and 2, the second key (454) represents at least three alphanumeric characters. In one embodiment, the second key (454) has a greater width than that of either the first key (452) or the third key (456). Similarly, the topography of the second key (454) may also be different from both the first and third keys (452) and (456), respectively. The second key (454) has a high topography point (454b) at a middle section of the key, with either exterior edges (454a) and (454c) having a lower point. The third key (456) is shown having an inverted profile of the first key (452). Namely, the first edge has a lower portion (456a) that is adjacent to the lower portion (454c) of the second key (454), and the second edge has a raised topography point (456b).

The non-planar topography of the physical keys shown in FIG. 4 is set forth to simplify positioning of the fingers on the surface of the key. By providing a non-planar surface, a user may be able to feel the proper positioned placement of the fingers on the keys. The invention should not be limited to the specific topography shown herein. In one embodiment, the topography may include different angles and configurations. The purpose of the topography is to enable the user to differentiate the keys based upon tactile feel, and thereby minimizing the sight requirement for employment of the reduced QWERTY keyboard. Accordingly, the physical keys may employ different topographical arrangements to enable a user to feel the position of a finger placement on the keys and to facilitate depression of adjacent keys.

Figure 5:
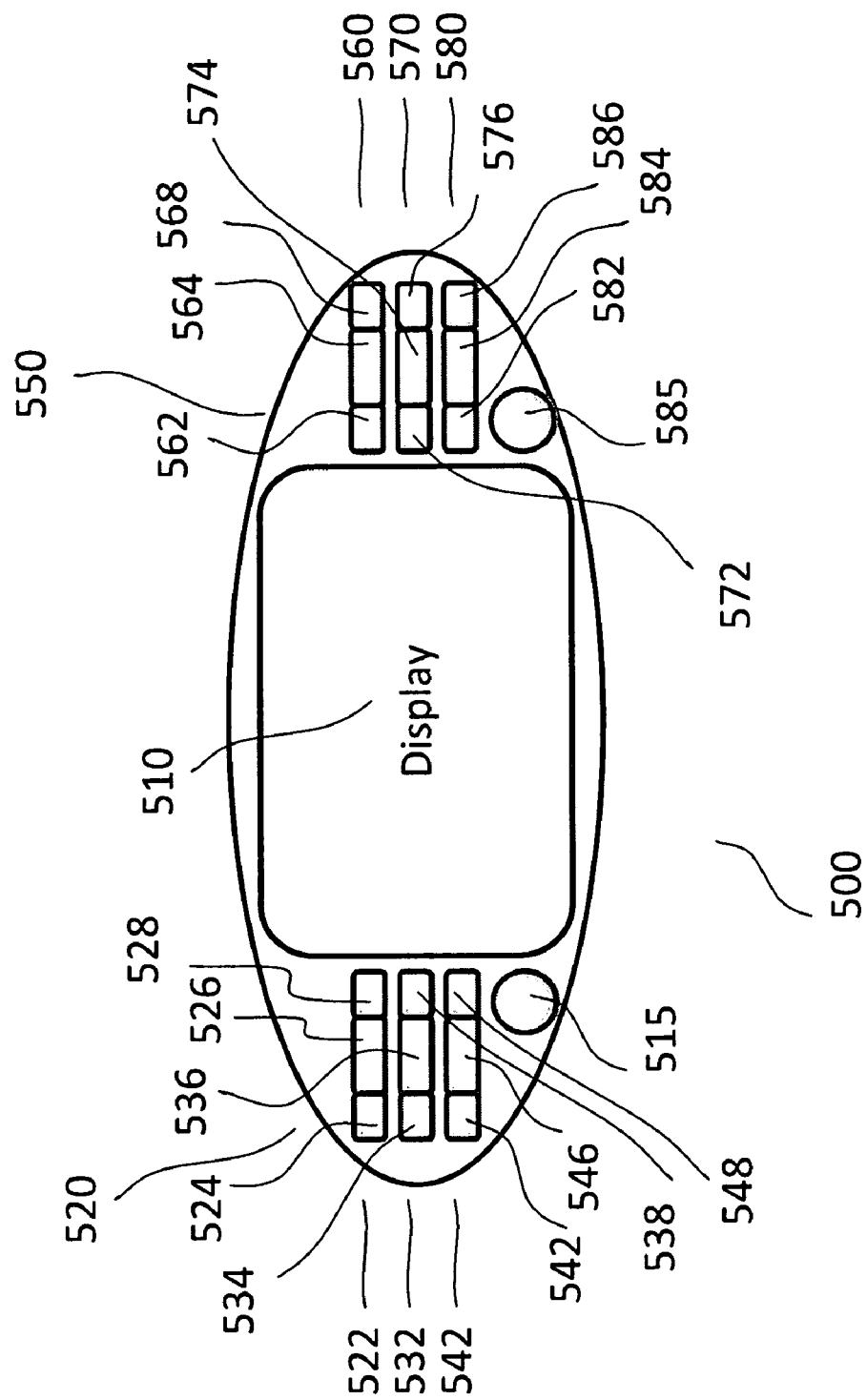
FIG. 5 is a block diagram of a computing apparatus with a three row split QWERTY keyboard

FIG. 5 is a block diagram (500) of a computing apparatus with a split QWERTY keyboard similar to that shown in FIG. 1. However, the split QWERTY keyboard of FIG. 5 is configured with three rows of keys on each side of the split keyboard arrangement. As shown, there is a visual display (510) with a first set of keys (520) and a second set of keys (550), with each set of keys (520) and (550) on each side of the display (510). Each set of keys (520) and (550) is limited to nine keys each. More specifically, the first set of keys (520) has three rows of keys (522), (532), and (542) with each row having three keys therein. The first row (522) has keys (524), (526), and (528). The second row (532) has keys (534), (536), and (538). The third row (542) has keys (544), (546), and (548). Similarly, the second set of keys (550) has three rows of keys (560), (570), and (580). The first row (560) has keys (562), (564), and (566). The second row (570) has keys (572), (574), and (576). The third row (580) has keys (582), (584), and (586). In addition to the rows of keys, there are two set aside joysticks, or trackballs, or rockers, or any other pointing devices (515) and (585) which can be assigned to carry any support functions. Examples of support functions are described above in relation to FIG. 1.

As shown in the physical layout of FIG. 5, there are three physical rows of keys on each side of the keyboard. FIG. 6 is a block diagram (600) demonstrating one embodiment of assignment of characters to each of the physical keys. The first keypad (620) has a total of nine keys, with three rows and three columns. The first row (622) has keys (624), (626), and (628). Keys (624) and (628) each have one character assigned thereto. Key (626) of the first row (622) has three characters assigned thereto. To select the character assigned to either key (624) or (628), a user merely must depress the respective key in a single stroke depression. However, since the middle key (626) has three characters assigned thereto, selection of a single character is a little more complex. In one embodiment, the middle key (626) is shown with one character adjacent to key (624) and a third character adjacent to key (628). The third character of the middle key (626) is an interior character. In order to select one of the exterior characters of the middle key (626), the user must select the middle (626) together with either key (624) or (628); depending upon which exterior character the user wants. For example, to select the character "W", the user must depress key (626) together with key (624), and the letter "W" will be selected and shown on an adjacent visual display. Similar selections are required for selection of each character of a middle key on the keyboards. To select the middle character of the middle key (626), the user solely selects the middle key (626). Since there are three physical rows of keys, each character is represented by a physical key. Although only one row of keys is described in detail in FIG. 6, this is merely an exemplary demonstration. The same character selection process may be applied to each of the keyboards and associated character assignment shown herein.

Figure 7:
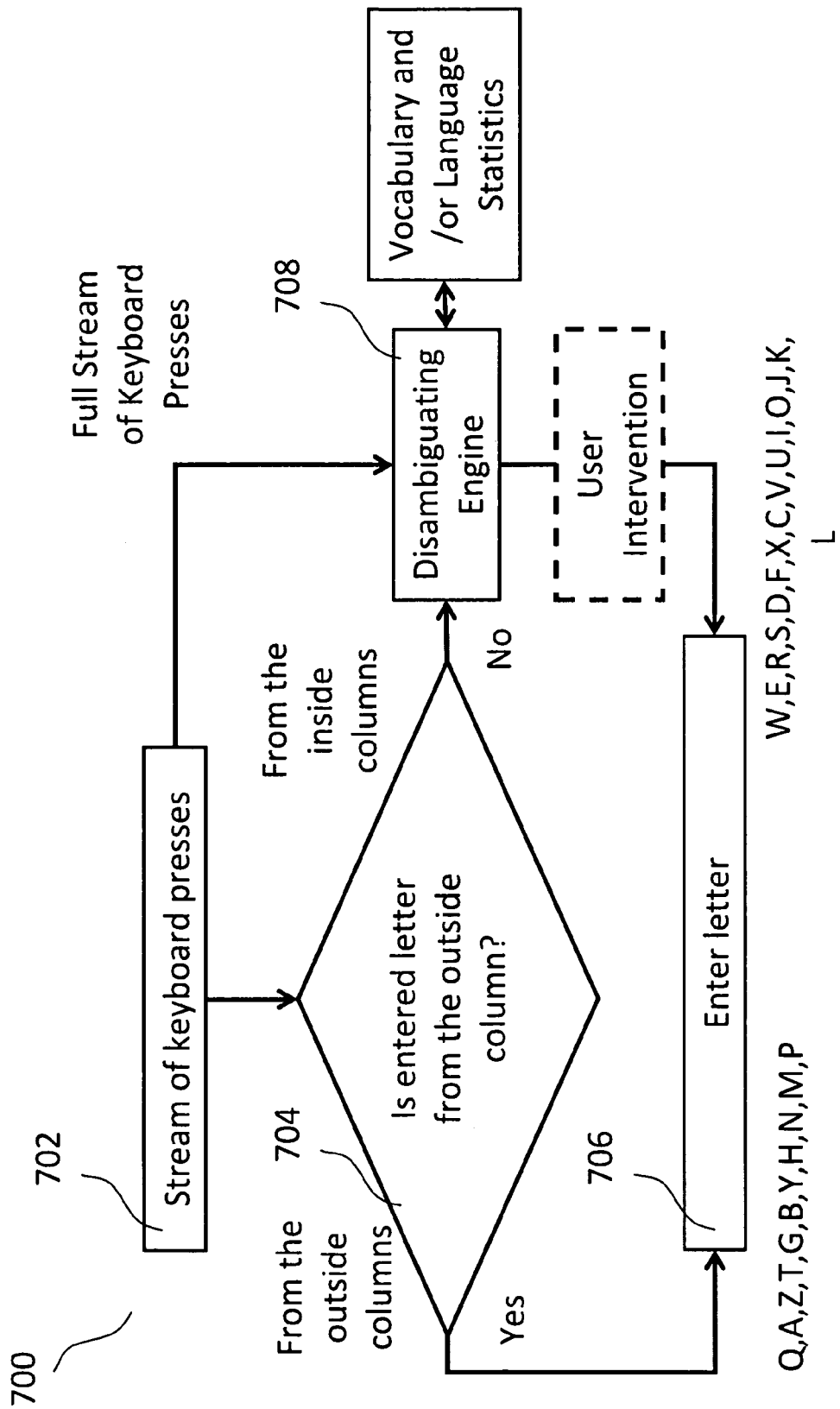
FIG. 7 is a flow chart illustrating integration of disambiguation software

In one embodiment, based upon the split keyboard arrangement with a reduced QWERTY keyboard, disambiguation software is employed to support the functionality of the reduced QWERTY keyboard as a full size QWERTY keyboard. The employment of the disambiguation software eliminates the need for simultaneous or near-simultaneous depression of adjacent physical keys for selection of a character assigned to a key with multiple character assignments. Disambiguation of the character selection in a key with multiple character assignments is conducted by software based on vocabularies or frequencies of the character usage. FIG. 7 is a flow chart (700) illustrating integration of disambiguation software based upon the hardware shown in FIGS. 1-6. Initially a keyboard depression is sensed (702). The specific key depressed will dictate the appropriate character for display. Following the sensed depression, it is determined if the depressed key is a key from an external column of one of the keypads (704). Each of the keys on the external columns of either keypad is mapped to a single character of the QWERTY keyboard. As such, if it is determined at step (704) that the depressed key is from one of the external columns on either keypad, the alphanumeric character assigned to the depressed key is entered (706). However, as shown in the different key layouts of FIGS. 1-6, each keypad has at least one button in each row that represents a plurality of alphanumeric characters. If it is determined as step (704) that the depressed key is from one of the internal columns on either keypad, a disambiguation engine is employed (708) to facilitate determining which character was selected. In one embodiment, disambiguation software may determine the appropriate character based upon the key selection based upon standard vocabulary for the language employed with the keyboard device.

Figure 8:
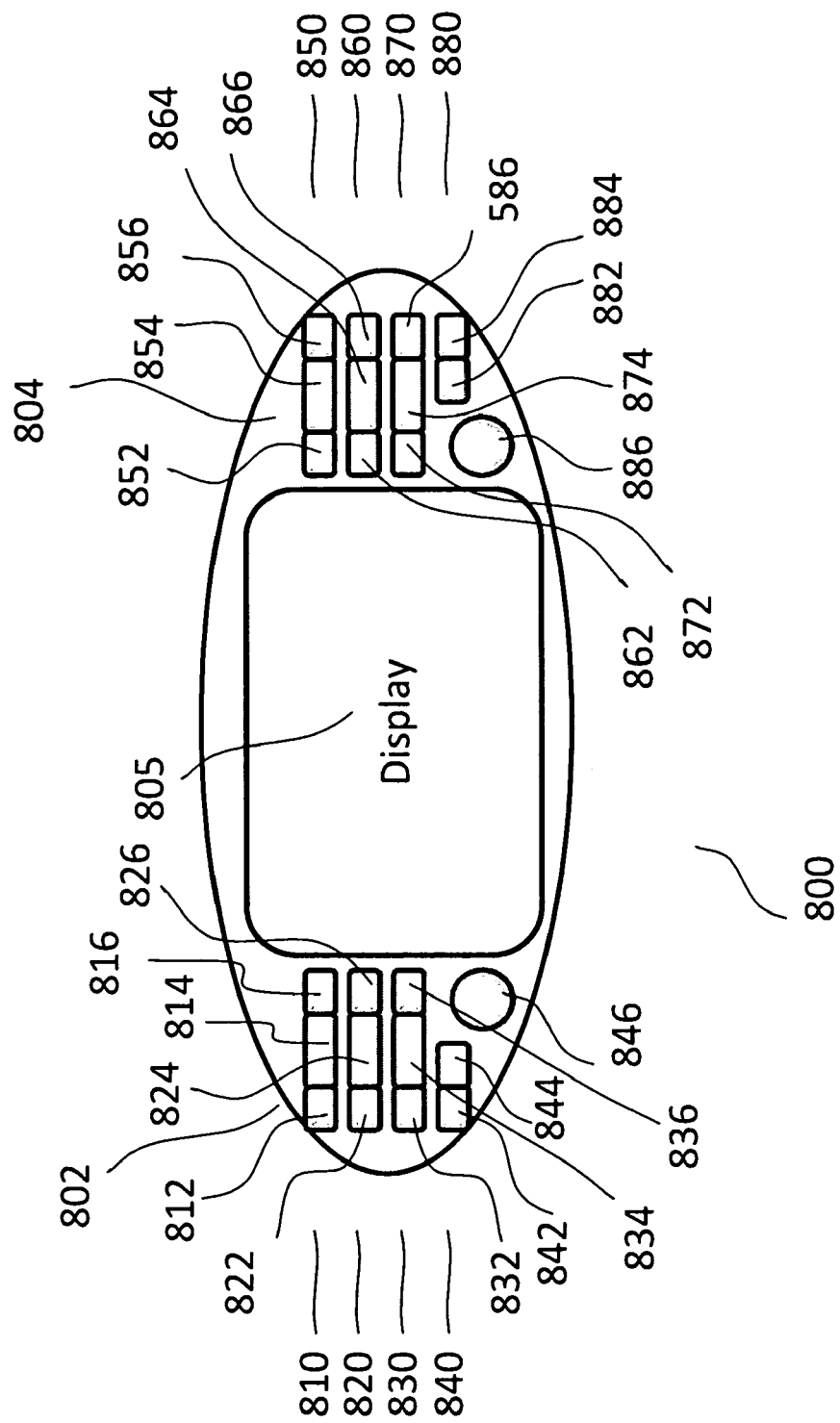
FIG. 8 is a block diagram of another embodiment of the reduced size QWERTY keyboard split by the visual display.

As shown in FIGS. 1-6 the keyboard employed with the computing apparatus is a split keyboard with two sets of keys and a visual display located there between. In one embodiment, the keyboards layout has two rows of keys. Similarly, in another embodiment, the keyboard layout has three rows of keys. However, the invention should not be limited to the specific rows shown. FIG. 8 is a block diagram (800) of another embodiment of the reduced size QWERTY keyboard split by the visual display. As shown, there is a visual display (805) with a keyboard (802) and (804) on each side of the visual display (805). The first keyboard (802) has four rows of keys (810), (820), (830), and (840). Each of the first three rows has three keys each. More specifically, the first row (810) has keys (812), (814), and (816), the second row (820) has keys (822), (824), and (826), and the third row (830) has keys (832), (834), and (836). The fourth row (840) shown herein has two keys (842) and (844). Although only the first keyboard (802) is described in the details of FIG. 7, the computing device herein includes a second keyboard (804). As shown, the second keyboard (804) has a layout that is similar to that of the first keyboard (802). More specifically, the second keyboard (804) has four rows of keys (850), (860), (870), and (880). Each row is shown with three keys. More specifically, the first row (850) has keys (852), (854), and (856), the second row (860) has keys (862), (864), and (866), and the third row (870) has keys (872), (874), and (876). The fourth row (880) shown herein has two keys (882) and (884). Separate from the rows of keys (810), (820), (830), (850), (860), and (870) there are special set aside keys/pointing devices (846) and (886) which are used to provide support functions as described above in both the two and three row configurations. Additional keys in the fourth row (842, 844, 882, and 884) can be mapped to additional support functions not covered by (846) and (886), or frequently used special characters such as @, #, *, brackets, etc., or used as shortcuts to call some common mobile device functions, e.g. camera mode, speaker phone, etc.

Figure 9:
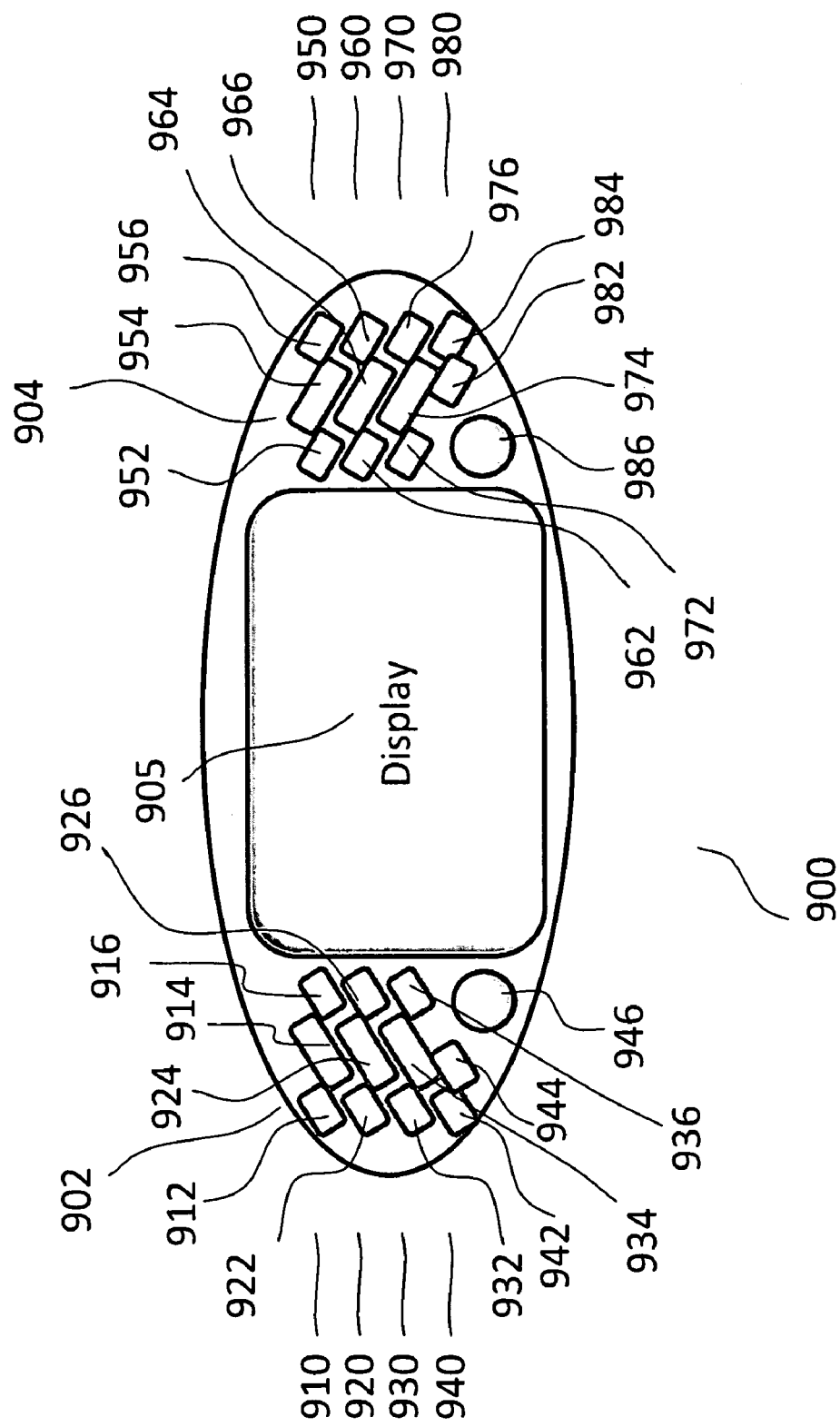
FIG. 9 is a block diagram of an alternative non-linear layout of the physical keys of the split keyboard.

The keyboard layouts shown in FIGS. 1-6 and 8 all employ a linear layout of the keys thereon. However, the invention should not be limited to a linear layout. FIG. 9 is a block diagram (900) of an alternative non-linear layout of the physical keys of the split keyboard. As shown, the portable computer apparatus is provided with a visual display (905) with a first keyboard (902) on one side of the visual display (905) and a second keyboard (904) on a second side of the visual display (905). In a similar manner to the layout of FIG. 8, there are essentially four rows of keys, with each of the rows mounted in an angular manner with respect to the plane of the surface of the computing device. The first keyboard (902) is shown with four rows of keys (910), (920), (930), and (940). The first row (910) has keys (912), (914), and (916). The second row (920) has keys (922), (924), and (926). The third row (930) has keys (932), (934), and (936). The fourth row (940) has keys (942) and (944). In addition, there is a set aside key (946), that functions in a similar manner, if not the same, as the set aside keys of the prior embodiments. The second keyboard (904) is shown with four rows of keys (950), (960), (970), and (980). The first row (950) has keys (952), (954), and (956). The second row (960) has keys (962), (964), and (966). The third row (970) has keys (972), (974), and (976). The fourth row (980) has keys (982) and (984). In addition, there is a set aside key (986), that functions in a similar manner, if not the same, as the set aside keys of the prior embodiments. As shown in both the first and second keyboards (902) and (904), respectively, is that the rows of physical keys are at a tilted angle. This angular tilt of the rows is provided to reduce the length of the physical row of keys. On a computing device with smaller real estate for placement of physical keys, a tilted angle for the keys supports utilization of the physical provision of space.

Although the tilted arrangement of the physical keys shown in FIG. 9 is for a split keyboard with four rows of keys, the titled key arrangement should not be limited to a fourth physical rows of keys. In one embodiment, the tilted arrangement of keys may be employed in a split keyboard that employs three (or fewer) physical rows of keys. It shall be also noted that the key rows can be tilted without shifting keys out of line and that the tilt angle can be changed so the outside keys (912), (922) and (932) of the (902) will be lower or higher than the same row keys which are facing the screen: (916), (926), (936). Although the description herein has only been provided for one of the keypads (902), the invention should not be limited thereto. In one embodiment, the arrangement of physical keys as described with respect to the first keypad (902) may be applied to the second keypad (904).

Figure 10:
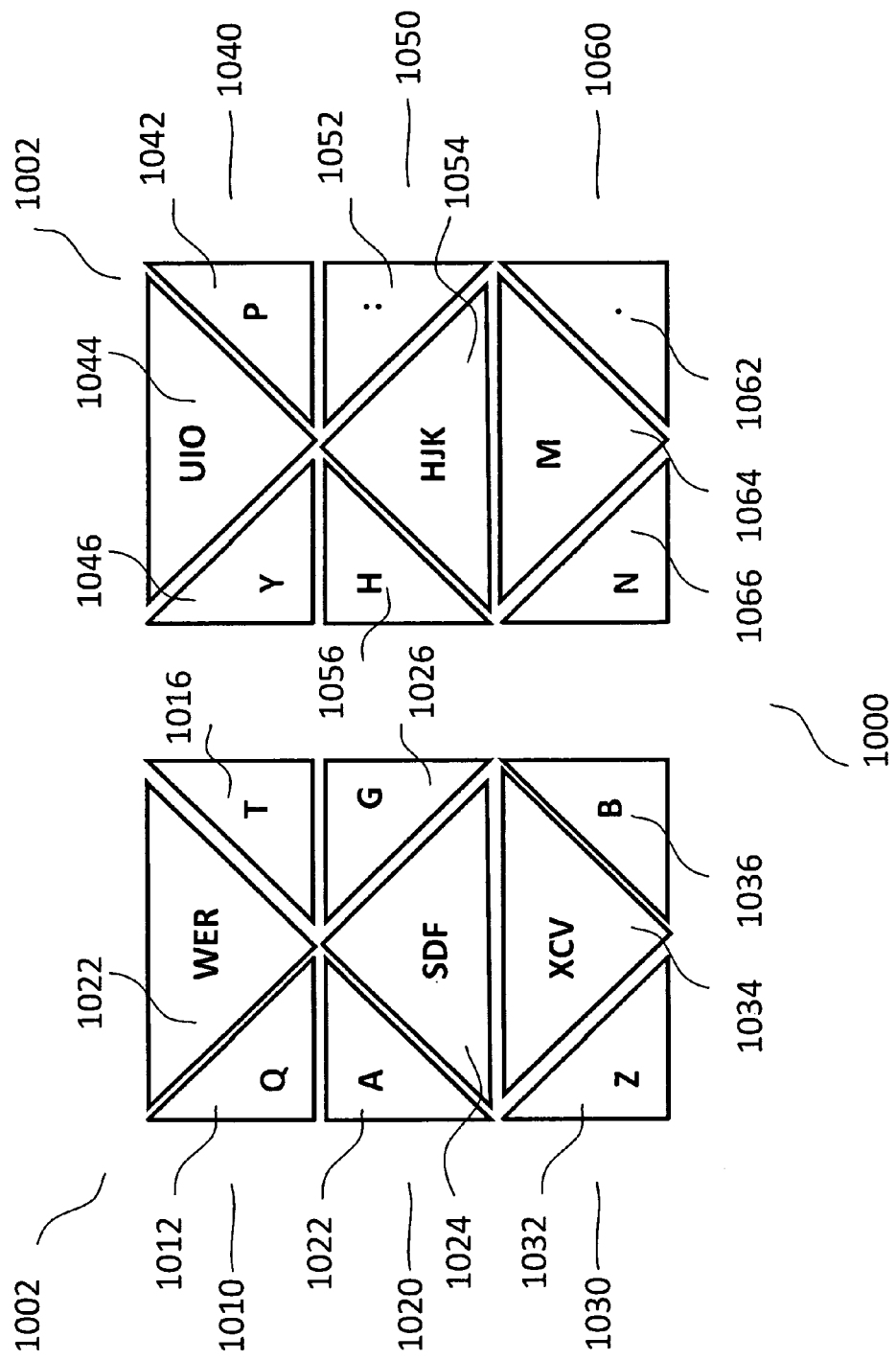
FIG. 10 is a block diagram of a split keyboard arrangement with three rows in each keyboard, with the physical keys shown herein each having a triangular shape thereto

The physical key arrangement can come in different forms. For examples, in the embodiments shown herein with three and four rows of physical keys, the keys are in some form of a quadrilateral shape. However, the invention should not be limited to the physical shape shown in the prior embodiments. FIG. 10 is a block diagram (1000) of a split keyboard arrangement with three rows in each keyboard. However, the physical keys shown herein each have a triangular shape thereto. As shown there are two keyboards, a first keyboard (1002) and a second keyboard (1004). The first keyboard (1002) has three rows of keys (1010), (1020), and (1030). The first row (1010) has three keys (1012), (1014), and (1016). Each of these keys has a triangular shape, with the middle key (1014) have an inverted placement on the keyboard with respect to the adjacent keys (1012) and (1016). The second row (1020) has three keys (1022), (1024), and (1026). Each of these keys (1022), (1024) and (1026) has an inverted placement on the keyboard with respect to the linearly adjacent keys, as well as the keys in the first row (1010) and the third row (1030). The third row (1030) has three keys (1032), (1034), and (1036). In a similar manner to rows (1020) and (1010), each of the keys herein has an inverted placement with respect to the linearly adjacent keys, as well as the keys in the second row (1020). The inverted placement of the keys enables the keys to occupy a smaller footprint on the real estate provided and better facilitate simultaneous or near-simultaneous depressing of adjacent keys. The keys of the second keyboard (1004) are placed in a similar and complementary manner to the keys of the first keyboard (1002). The second keyboard (1004) has three rows of keys (1040), (1050), and (1060). The first row has three keys (1042), (1044), and (1046). Each of these keys has a triangular shape, with the middle key (1044) having an inverted placement on the keyboard with respect to the adjacent keys (1042) and (1044). The second row (1050) has three keys (1052), (1054), and (1056). Each of these keys (1052), (1054) and (1056) has an inverted placement on the keyboard with respect to the linearly adjacent keys, as well as the keys in the first row (1040) and the third row (1060). The third row (1060) has three keys (1062), (1064), and (1066). In a similar manner to rows (1040) and (1050), each of the keys herein has an inverted placement with respect to the linearly adjacent keys, as well as the keys in the second row (1050). Accordingly, the triangular shape of the keys and inverting of placement of the keys enables the keys to occupy a small footprint on the surface of the computing apparatus.

The application of the triangular shape of the keys shown in FIG. 10 is with respect to an embodiment that employs three rows of keys, thereby eliminating the need for a virtual row of keys. However, in one embodiment, the triangular shape and placement of the physical keys may be employed with a two row embodiment, as shown in FIG. 1, or a four row embodiment as shown in FIGS. 8 and 9. Accordingly, the shape and placement of the keys is not limited to the quantity of rows provided.

Figure 11:
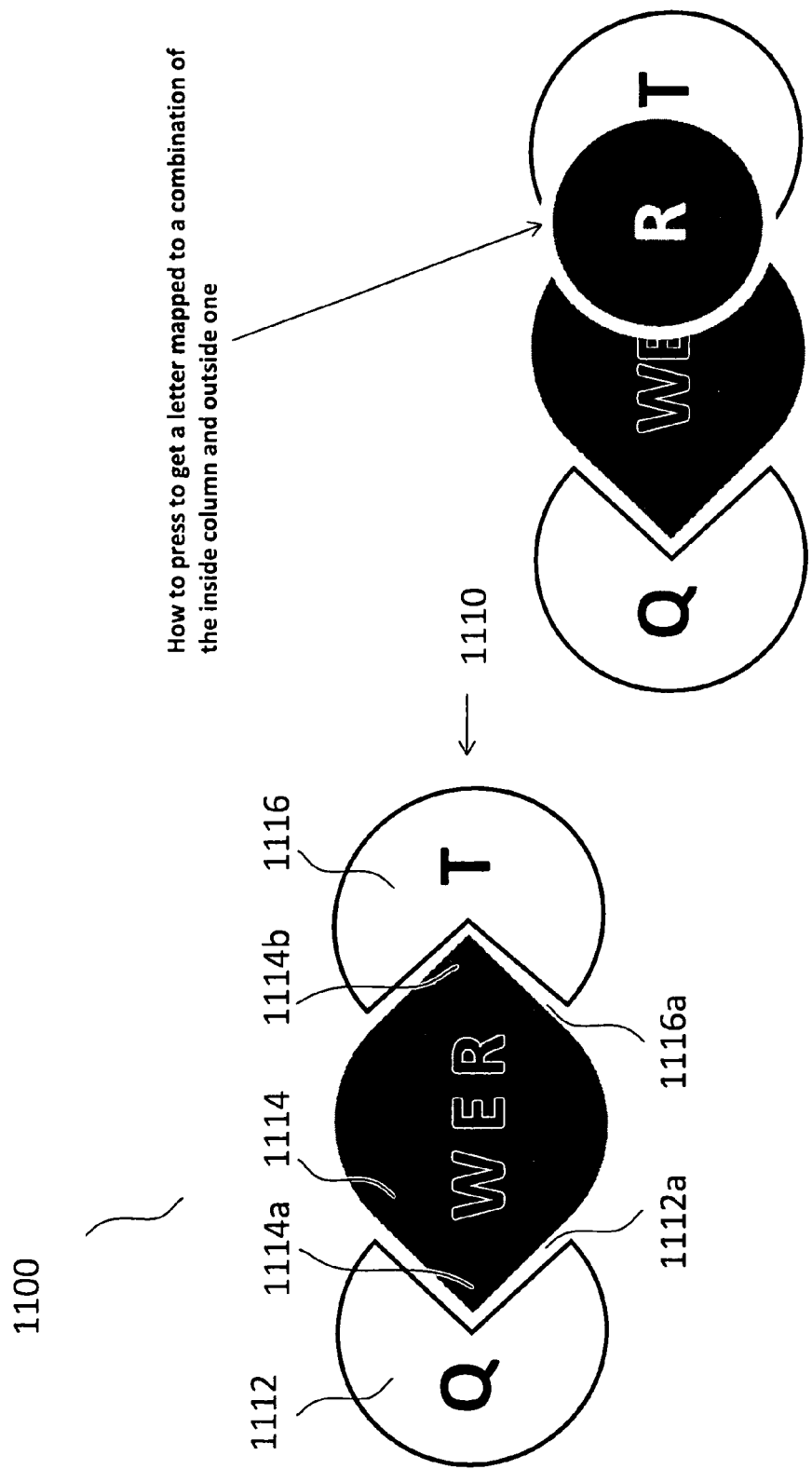
FIG. 11 is a block diagram of a non-linear shape for the keys of the split keyboard.

In another embodiment, the shape of the keys may be non-linear. As shown above, the keys are shown with a quadrilateral shape and/or a triangular shape. FIG. 11 is a block diagram (1100) of a non-linear shape for the keys of the split keyboard. In the example shown herein, the illustration is limited to a single row of keys (1110). As shown, there are three keys in the row (1112), (1114), and (1116). The first key (1112) is mapped to a single character. Similarly, the third key (1116) is mapped to a single character. However, the second key (1114) is mapped to multiple characters. This mapping of characters is shown above in the keyboard layouts that employ three rows of physical keys. The first and third keys (1112) and (1116) each have a circular shape on the exterior edge with a cutout at an interior portion of the key. More specifically, the first key (1112) has a cutout (1112a) and the second key (1116) has a cutout (1116a). The second key (1114) has an oval shape with two triangular forms adjacent to the first and third keys (1112) and (1116), respectively. More specifically, the second key (1114) has a first triangular form (1114a) that is sized to be received by the cutout (1112a) of the first key (1112). Similarly, the second key (1114) has a second triangular form (1114b) that is sized to be received by the cutout (1116a) of the third key (1116). In other words, the exterior mounted physical keys (1112) and (1116) have cutouts, and the interior mounted physical key (1114) has two add-ons (1114a) and (1114b), wherein each cut-out is sized to receive the add-on of the adjacent physical key. Selection of the character(s) of the second key (1114) is performed in a similar manner to that shown and explained in detail in FIG. 5. The advantage of the non-linear shape of the physical keys is that they are sized to fit together in a manner that requires a smaller footprint than keys with a quadrilateral (or other linear) shape and better facilitation depressing adjacent physical keys.

FIGS. 1-6 and 8-11 all show keys with indicia placed thereon to convey the data associated with the keys. However, the data associated with the keys may change based upon associated functionality of the computing device.

Figure 12:
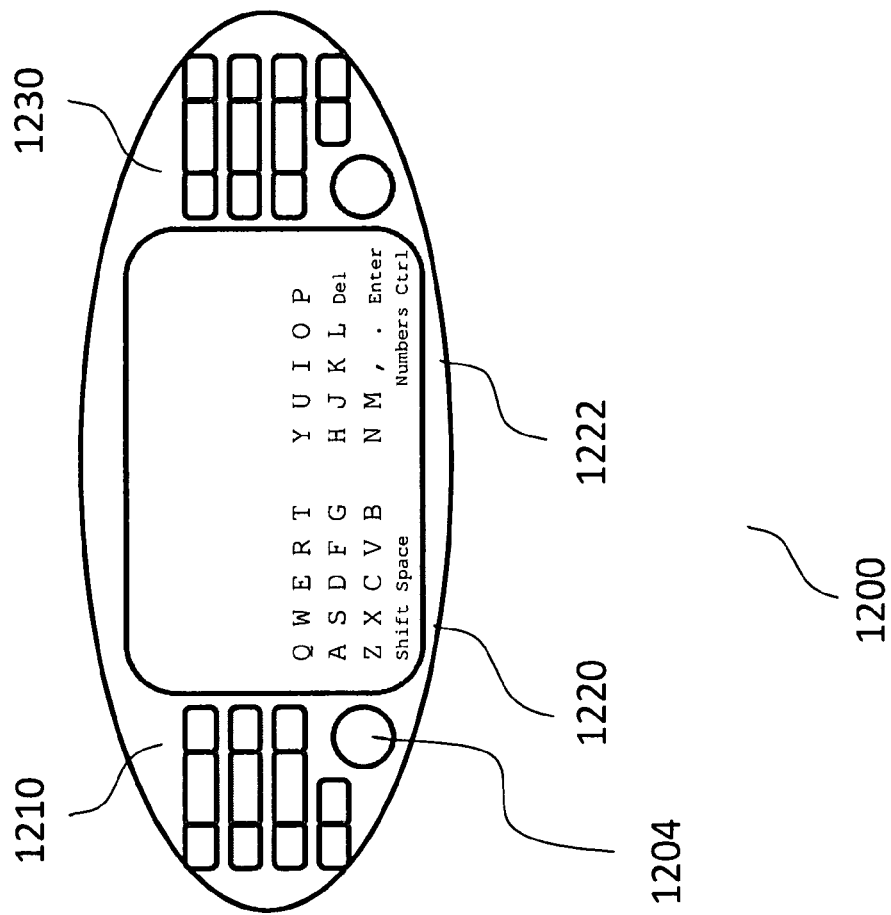
FIG. 12 is a block diagram of a computing device with a prompt on the visual showing two variants of key mapping.

FIG. 12 is a diagram (1200) of a computing device with a split keyboard wherein the indicia pertaining to the keys are presented on a visual display. More specifically, a visual display (1205) is provided, together with two sets of keys (1210) and (1230). There are no indicia provided in the individual keys in the two sets (1210) and (1230). Rather, the key mapping is displayed on a visual display (1205) associated with the keyboard. In one embodiment, the visual display (1205) is provided with one set of indicia (1220) associated with the first set of keys (1210) and a second set of indicia (1222) associated with the second set of keys (1230). The example shown herein is based on a virtual QWERTY layout provided in the visual display. However, the invention should not be limited to a QWERTY layout. In one embodiment, the virtual layout of the key translation provided in the visual display (1205) may be mapped as telephone keypad. Similarly, in another embodiment, different layouts of keys may be provided in the visual display, with a mapping of the layout to the physical keys of the computing device. Accordingly, indicia may be provided virtually on the visual display and mapped to a corresponding key, or associated key strokes, of the computing device.

Figure 13:
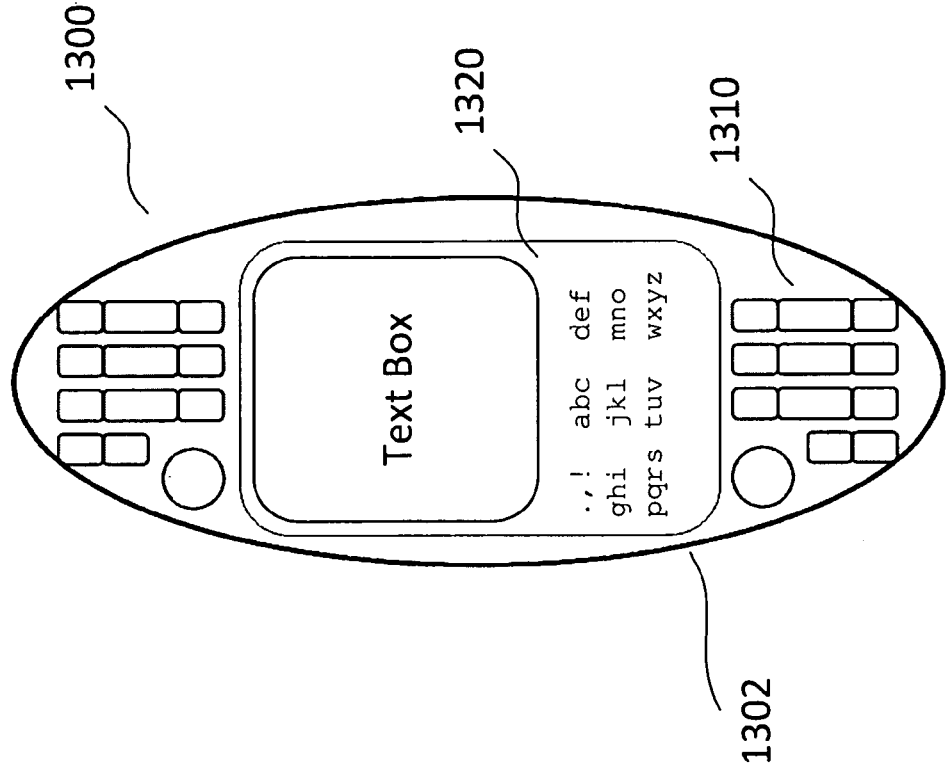
FIG. 13 is a block diagram showing a visual display changed based on device orientation.

It is further recognized in the art that one or more sensors may be placed in a computing device, with the sensors sensing the position of the computing device. The position sensing can accommodate the visual display changing from a horizontal conveyance of indicia to a vertical conveyance of indicia, or the opposite depending upon the prior position of the computing device. FIG. 13 is a block diagram (1300) of a computer device (1302) with at least one set of physical keys (1310) and a visual display (1320). A mapping is provided in the visual display (1320) to communicate the data pertaining to the physical key. As shown herein, the computing device (1302) is held in a vertical position, as opposed to the horizontal position shown in FIG. 12. The mapping of keys is changed to accommodate vertical position of the computer device (1302). More specifically, the indicia provided on the visual display (1320) are re-oriented to a vertical display. In one embodiment, the re-orientation of the display data is based upon a command received from the sensor. The sensor may come in different forms, including an inertial motion sensor, an inertial or magnetic orientation sensor, a proximity sensor, a light sensor or a combination of sensors. Similarly, in one embodiment, the re-orientation of the display data is based upon a manual command. Accordingly, the sensor supports a re-orientation of data on the visual display (1320).

Figure 14:
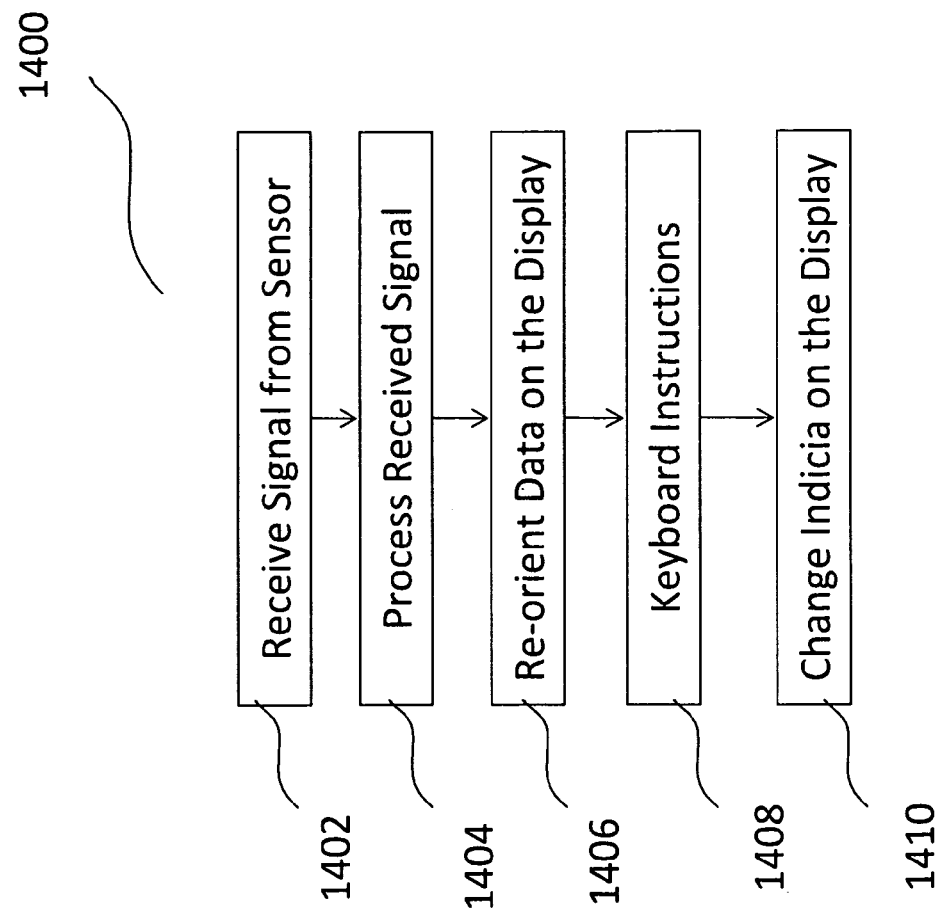
FIG. 14 is a flow chart illustrating communication of sensor data to orientation of visual display data.

FIG. 14 is a flow chart (1400) illustrating processing of a signal received from a sensor to re-orient data provided on the visual display. A signal is received from the sensor (1402) and the received signal is processed by a sensor signal instructions (1404). Based upon processing of the sensor signal, the signal is interpreted as a command to re-orient data on the visual display (1406). Keyboard instructions (1408) change the layout of indicia on the visual display (1410). Accordingly, the sensor processes the position of the computing device and communicates the position data to the visual display for re-orientation of the display data.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

FIG. 15 is a block diagram (1500) illustrating placement of instructions for employment of the reduced keyboard to support the functionality of a full-size keyboard. The illustration shows a computer system with a processor unit (1506) coupled to memory (1510). Although only one processor unit (1506) is shown, in one embodiment, the computer system may include more processor units in an expanded design. The computer system includes one or more sensor (1502) and a visual display (1512), both in communication with the processor unit (1506). A keyboard manager (1508) is provided local to memory (1510) and in communication with the processor unit (1506). The keyboard manager supports translation of the actuation of the keys and the pattern in which the keys are actuated. The keyboard manager (1508) is in communication with the processor unit (1506) which then supports presentation of selected indicia on the visual display (1512). In addition, a sensor signal manager (1504) is provided local to memory (1510). The sensor signal manager (1504) supports determination of orientation of the computer system itself. More specifically, the sensor signal manager (1504) enables the proper orientation of indicia on the visual display (1512) based upon the orientation of the device itself. The sensor signal manager (1504) is shown in communication with the processor unit (1506), which conveys the orientation data to the visual display (1512).

As shown herein, the keyboard manager (1508) and sensor signal manager (1504) each reside in memory (1510) local to the computer system. In one embodiment, the managers may be in the form of modules and/or instructions that may reside as hardware tools external to local memory, or they may be implemented as a combination of hardware and software. Similarly, in one embodiment, the managers and modules may be combined into a single functional item that incorporates the functionality of the separate items. Each of the managers and modules are local to the computer system (1500). However, in one embodiment they may be collectively or individually distributed across the network and function as a unit to support the functionality of the reduced size keyboard. Accordingly, the managers and modules may be implemented as software tools, hardware tools, or a combination of software and hardware tools, to collection and organize data content.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, flash memory, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

It will be appreciated that, although specific embodiments of the invention have been described herein for purposes of illustration, various modifications may be made without departing from the spirit and scope of the invention. For example, in one embodiment, the physical keys may be in the form of a virtual representation on a visual display. More specifically, the computing device may be provided with an enlarged visual display, or one or more additional visual displays. In either form, the visual display(s) may include indicia in the form representing the physical keys, therein becoming virtual keys. One or more sensors are provided to determine actuation of virtual keys with the actuation represented on at least one of the visual displays provided. Accordingly, the scope of protection of this invention is limited only by the following claims and their equivalents.

I claim:

1. A keyboard for a computing device comprising:
   two individual keypads separated by a visual display or space between them;
   each of said individual keypads having a small quantity of keys, wherein the total quantity of keys on both of said two keypads is less than the total quantity of alphanumeric characters mapped to these keys;
   said two keypads in combination incorporating a full character alphabet layout for use on a device; and
   a first secondary data entry device assigned to said first keypad and a second secondary data entry device assigned to said second keypad, wherein each of said secondary data entry devices are employed to select a supplementary feature.

2. The keyboard of claim 1, further comprising a first of said individual keypads on a left side part of said visual display with keys of said first keypad mapped to characters on a left side of a QWERTY keyboard.

3. The keyboard of claim 1, further comprising a second of said individual keypads on a right side part of said visual display with keys of said second keypad mapped to characters on a right size of a QWERTY keyboard.

4. The keyboard of claim 2, further comprising mapping an individual character to an external column key of each of said first and second keypads, and mapping multiple characters to each of interior column keys.

5. The keyboard of claim 4, wherein the interior column keys have a greater width than the exterior column keys.

6. The keyboard of claim 4, wherein the interior column keys have multiple characters mapped thereto, and said interior column keys support a pattern of depression of said interior column key with another key in said keypad for selection one of the multiple characters mapped to the interior column keys.

7. The keyboard of claim 1, further comprising employing disambiguation software for selection of a character from one of said keys having multiple characters assigned to said key.

8. The keyboard of claim 1, wherein said first and second secondary data entry devices are selected from the group consisting of: a pointing device, a joystick, a trackball, and a rocker pad.

9. The keyboard of claim 1, wherein one column of keys have cut-outs and the adjacent column of keys have add-ons to facilitate pressing combinations of keys in two adjacent columns.

10. The keyboard of claim 1, further comprising an external surface of the individual keys having an uneven topography.

11. The keyboard of claim 1, further comprising displaying mapping of characters to keys on said visual display.

12. The keyboard of the claim 1, further comprising the keys of one of said keypads are mapped to numbers in a manner consistent with an ITU keypad.

13. The keyboard of the claim 1 wherein the key mappings are displayed on the visual display as a prompt, said mappings can be changed.

14. The keyboard of the claim 1, further comprising changing the key mappings based on a command received from a sensor, the sensor selected from the group consisting of: inertial, magnetic, capacitance, light, pressure sensor, or a combination thereof.

* * * * *